Patented Sept. 8, 1953

2,651,571

UNITED STATES PATENT OFFICE 2,651,571

ALKALINE TREATING METHOD FOR OBTAINING RAMIE AND OTHER FIBERS

John C. van Dyk, Bernardsville, N. J., assignor, by mesne assignments, to Howard E. St. John and Laura P. St. John, both of Mendham, N. J., jointly No Drawing. Application June 26, 1948, Serial No. 35,522

7 Claims. (Cl. 92—10)

This invention relates to a chemical process for what is sometimes referred to as the debarking and degumming of fibres of the kind found in various plant stems and leaves and having characteristics fitting them for textile and other commercial uses.

In my co-pending application, Serial No. 35,521, filed June 26, 1948, now abandoned, the utility of the process is described, and it is claimed, in a particular environment and application, namely, in combination with one or more steps appropriate in the handling of such plants of the above character as incorporate long, continuous fibres (that is, fibres of a length many times that of the staple length capable of being processed by the cotton system); the process of the said application having for its object the reduction of such long fibres to processable length and form.

In the instant application the process is described and claimed in its broader aspects and independently of the particular associated steps preferred for the handling of the "long fibre" plants (such as ramie, linen flax, jute, hemp, sisal and pita) and with or without preliminary mechanical operations to remove some of the woody material. The process, as herein described, is applicable as well to the treatment of the "short fibre" plants, such as seed flax.

In the case of all of these plants the fibres, woody or tissue material, and bark or skin, are so closely associated with or bonded to the surrounding structure by sundry gummy substances as to be extremely difficult to obtain in quantity, economically. This long persisting difficulty is such that many of these fibres have not been available at all and have gone to waste. In the case of seed flax, for example, the common practice is to harvest the seed crop (for oil), and, due to the lack of a suitable process for obtaining the fibres, to dispose of the fibre-containing stems by burning over the fields.

The present invention provides an inexpensive method of coincidently debarking and degumming and disassociating the fibres from the balance of the leaf and stem material.

Generally speaking, the preferred disassociating step comprises digesting the raw vegetable material with an alkaline solution for a time and under conditions appropriate to effect the debarking and coincidently the degumming of the fibres without injury to them. As a result of this treatment, the gums are substantially completely removed from the fibres, the bark largely disintegrated and the woody material made free from the fibres as to be easily separated by picking machines.

To ensure uniformly reliable and satisfactory results, the alkaline solution employed for the above debarking and degumming step must satisfy several important requirements, as follows: The essential alkaline ingredient is an alkali metal compound such as a sodium, potassium, and/or lithium compound, of which sodium is preferred by reason of its cheapness. The concentration of the alkali metal compound, in terms of active alkali metal oxide, $R_2O$, is in the range of about 0.37 to about 1.2% by weight of the solution. In addition, the solution must have a pH of between 12.4 and 13, preferably between 12.6 and 12.9. It has been found that above a pH of 13 destruction of the fibre occurs, while below a pH of 12.4 the digestion step is unfavorable to carry out for economic reasons and, more importantly, because the digestion is incomplete. Above the active $R_2O$ concentration of 1.2%, the fibre is subject to deleterious chemical attack; below a concentration of 0.37%, there is insufficient disintegration of the bark and dissolution of the gums. Also, if the $R_2O$ concentration is not maintained within the stated range, the pH of the solution will be correspondingly affected. The alkali metal compound is for all practical purposes independent of its anion portion. As preferred alkali metal compounds, there may be mentioned sodium, potassium, and lithium silicates, such as the sesquisilicates, metasilicates and orthosilicates, of which sodium sesquisilicate and sodium metasilicate are specially suitable.

During digestion the pH of the solution must be maintained in the ranges indicated above. Such maintenance of the pH may be accomplished in any desired way, but it is preferred to employ buffered solutions to keep the pH within the stated limits during the digestion. The silicate compounds recited above are inherently at least partially buffered, so that solutions of the same during use will have a substantially constant pH value within the required ranges. Where necessary, however, the solution of alkali metal compound can be buffered, at least to some extent, by addition of a buffering agent in order to bring it within the above stated pH ranges. Buffer agents for this purpose are well known and may include, for example, sodium carbonate, sodium sulphide, sodium chloride, boric acid, sodium acid phosphate, and the like.

It will be noted that the concentration range of $R_2O$ is given in terms of "active" alkali metal oxide, by which expression it is intended to exclude the buffered portion of the oxide, which has been inactivated, temporarily at least, by virtue of the buffering phenomenon. More fundamentally, the active alkali metal oxide may be defined, for purposes of this invention, as alkali titratable with phenolphthalein.

It is desirable, although not essential, to incorporate with the solution of alkali metal compound a small amount of an alkanolamine or alkyl-substituted alkanolamine, such as an ethanolamine or the ethyl substituted ethanolamines, say about 1 to about 3% by weight, and also a similar amount or less, say down to about 0.5%, of an unsaturated fatty acid such as oleic, etc. The alkanolamine compounds act as emulsifiers and bring about a better mixing of the material and dissolution of the gums, etc. during digestion, while the fatty acids form soaps which effect a cleaning action on the fibres.

The digestion of the stock is suitably carried out at boiling temperature and at atmospheric pressure for a time sufficient to debark and degum the fibres. It has been found that while the pressure may be increased up to about 45 lbs. p. s. i., and the temperature increased to correspond to such increased pressure, above that figure it is not desirable to operate because injury to the fibres results. The time of digestion from a practical standpoint may range from about ½ to about 4 hours, although it may vary within wider limits, especially in regard to the upper of such limits. Generally, also, the time will depend upon the temperature, and at higher temperatures the time will be shorter, and vice versa. The main consideration in this connection, of course, is to carry out the digestion until the material is completely debarked and degummed. Preferably, the digestion is performed without mechanical stirring, and in any event under non-oxidizing conditions with respect to the fibre.

After digestion, the fibres are removed from the solution and rinsed with water. The rinsing is aided if, during the digestion step, an alkanolamine and an unsaturated fatty acid above described have been added to the solution. The fibres may then be dried in any desired manner, as by centrifuging, etc.

The resulting product will be recognized as having commercial utility for a variety of purposes. In addition to the fibres, it contains only a scattering of interspersed woody particles which, however, are disassociated from the fibres and hence readily separable. If the fibres were initially of processable length (as in the case of seed flax, for example), the product may be processed without further treatment, the woody particles being removed (as by the pickers) just as the leaf material and other trash is removed from cotton stock.

For textile purposes, however, it is preferred to subject the fibre mass to a softening operation immediately following the digestion and rinsing steps. As a result of such treatment the individual fibres separate more readily and hence are less susceptible to breakage in subsequent processing. In this operation the fibres are treated with a solution containing a small amount of a softening agent, say up to about 10% by weight, at a temperature which may vary from about 40 to about 100° C. A variety of softening solutions and treating temperatures are useful in this connection, for example, a 2 to 10% solution of a salt of a saturated hydrocarbon sulphonic acid at 84 to 100° C., which may include such agents as the sodium salts of arylalkyl sulphonates and alkyl naphthalene sulphonates; a 2 to 10% solution of a sulphated fatty alcohol at 40 to 60° C., which may include such agents as sulphated cetyl alcohol, sulphated lauryl alcohol, sulphated myristyl alcohol; sulphonated vegetable oil; highly sulphonated fatty acid esters; diglycol stearate; lauric acid ester of diethylene glycol; lauryl alcohol; a 2 to 4% solution of a non-ionic surface active material at 100° C., which may include such agents as the N-alkylol fatty amides, the polyoxyalkylene esters, and the like; a 0.2 to 2% solution of a cationic surface active material at 40 to 60° C., which may include such agents as complex amides of fatty acids like lauric, oleic, ricinoleic, stearic, palmitic, myristic, capric; higher aliphatic and mixed aliphatic-aromatic quaternary ammonium halides; higher aliphatic amines and derivatives thereof, etc. The softening step may be carried out for any suitable time sufficient to attain the desired degree of softening, and in practice this may be about 30 minutes, more or less. The fibre which results from the softening step may be filmed, or penetrated, or both, by the softening agent.

Another desirable but not essential step may be performed on the material prior to, or on the digested mass, after the digestion step. This consists in a treatment with one of a variety of agents which have been found to improve the lustre of the fibres finally obtained, and for this reason these agents are referred to as lustering agents. They are employed in the form of solutions of low concentration at room temperatures or higher. As examples of such solutions there may be mentioned the following, all percentages being on a weight basis: a 4 to 6% solution of ammonium carbonate for use at temperatures of 80 to 100° C.; a 0.5 to 1% solution of sulfuric acid at 80 to 100° C.; a 2 to 4% solution of boric acid at 80 to 100° C.; a solution of boric acid, as mentioned, followed by a solution of sulfuric acid, as mentioned; a solution of 2 to 4% boric acid plus 0.5 to 2% of sodium hypochlorite at 20 to 30° C.; a solution of a softening agent of the kind and of the concentration described above plus 2% of pine oil at 20 to 40° C.; a 0.5 to 2% solution of sodium hypochlorite at 20 to 30° C., optionally followed by treatment with a "getter," i. e., an agent for combining with or inactivating excess chlorine. Treatment with any of the foregoing solutions may be carried out for any suitable length of time, say about 30 to 60 minutes, and preferably followed by rinsing. In the case of the acid solutions, if a complete water rinse of acid is not possible, another rinse may be used employing, say, a dilute solution of sodium carbonate at an elevated temperature, say about 100° C.

The following examples may serve to illustrate the invention.

*Example No. 1*

One hundred pounds of green ramie stalks cut to 1⅜ inch lengths were placed in a digester and a solution containing 2% by weight of sodium metasilicate (0.6% of $Na_2O$) was added, the pH of the solution being 12.8. To this mixture was also added 2% by weight of a solution of mixed ethyl ethanolamines and 2% by weight of oleic acid. The digester was then closed and after proper venting was brought up with steam pressure to forty pounds per square inch. By slightly reducing or increasing the steam pressure or by mechanical tumbling the mixture was kept in constant motion in order to obtain the highest possible emulsification of the solution and good contact between the latter and the fibrous material. For a period of one hour the raw material was digested, after which the solution was drained and the fibrous material transferred to a large tank or washing machine in which the greater part of the emulsified and non-fibrous loose particles were washed out, leaving a mixture of debarked and degummed fibres and pieces of woody material, which was then ready for the softening step. The mixture was rinsed and centrifuged and then placed in a tank containing a solution of 2% by weight of an aliphatic amino ethylamine and heated to a temperature of 80° C. for a period of one-half hour after which the fibrous conglomerate was removed, centrifuged and dried in a hot air drier. Following this step it was possible to remove, by shaking and handling, most of the woody pieces so that the resulting product contained mostly fibre of one specific length (1⅜") freed from gummy substances, and constituted a product which can be handled by ordinary picking and carding machinery in a cotton mill. It was possible to make a coherent card sliver and to accomplish proper drawing and roving with these processed fibres.

*Example No. 2*

One hundred pounds of California seed flax straw (Golden), previously subjected to a mechanical cleaning operation to remove the excess of loose woody material, was placed in a closed tank and then boiled with a 0.5% by weight sulphuric acid solution for thirty minutes after which it was rinsed, using sodium carbonate to remove any excess of sulphuric acid. The seed flax straw was then boiled at atmospheric pressure in a solution containing 2% by weight of sodium sesquisilicate (0.74% of $Na_2O$; pH 12.9), 1% by weight of mixed ethyl ethanolamines and 1% by weight of oleic acid for a period of sixty minutes after which the product was thoroughly rinsed and washed with hot water. At the end of the rinsing operation, a 3% by weight solution of amide of lauric acid was added and this mixture kept at a temperature of 90° C. for a period of thirty minutes. The processed seed flax straw was then centrifuged and shaken in order to remove most of the woody particles. It was next dried in a hot air drier. A lustrous fibre material was thus obtained, which when woven into towelling, or blended with cotton fibres and woven into cloth, produced fabrics of excellent quality.

While the invention has been described in connection with more or less specific embodiments thereof, it will be understood that it is capable of obvious variations without departing from its scope.

In the light of the foregoing description, the following is claimed:

1. The method of producing fibers processable by a conventional textile fiber processing system from undecorticated fiber-containing vegetable material selected from the class consisting of ramie, linen flax, jute, hemp, sisal, pita, and seed flax, comprising digesting the material with a buffered aqueous solution of an alkali metal silicate having a pH of 12.4 to 13 and containing about 0.37 to about 1.2% by weight of active alkali metal oxide at a pressure in the range of about 15 to 45 p. s. i. and at a boiling temperature, and maintaining the solution at said pH throughout the course of said digesting step.

2. The method of producing fibers processable by a conventional textile fiber processing system from undecorticated fiber-containing vegetable material selected from the class consisting of ramie, linen flax, jute, hemp, sisal, pita, and seed flax, comprising digesting the material with a buffered aqueous solution of sodium silicate having a pH of 12.4 to 13 and containing about 0.37 to about 1.2% by weight of active sodium oxide ($Na_2O$) at a pressure in the range of about 15 to 45 p. s. i. and at a boiling temperature, and maintaining the solution at said pH throughout the course of said digesting step.

3. The method of producing fibers processable by the cotton or wool fiber processing system from fiber-containing vegetable material selected from the class consisting of undecorticated ramie, linen flax, jute, hemp, sisal, pita, and seed flax, comprising digesting the material with an aqueous solution of sodium sesquisilicate having a pH of 12.4 to 13 and containing about 0.37 to about 1.2% by weight of active sodium oxide ($Na_2O$) at a pressure in the range of about 15 to 45 p. s. i. and at a boiling temperature, and maintaining the solution at said pH throughout the course of said digesting step.

4. The method of producing fibers processable by the cotton or wool fiber processing system from undecorticated fiber-containing vegetable material selected from the class consisting of ramie, linen flax, jute, hemp, sisal, pita, and seed flax, comprising digesting the material with an aqueous solution of sodium metasilicate having a pH of 12.4 to 13 and containing about 0.37 to about 1.2% by weight of active sodium oxide ($Na_2O$) at a pressure in the range of about 15 to 45 p. s. i. and at a boiling temperature, and maintaining the solution at said pH throughout the course of said digesting step.

5. The method of producing fibers processable by the cotton or wool fiber processing system from undecorticated ramie which comprises digesting said undecorticated ramie with an aqueous solution containing sodium silicate, about 1 to about 3% by weight of an alkanolamine, and about 1 to about 3% by weight of an unsaturated fatty acid, said solution having a pH of 12.4 to 13 and containing about 0.37 to about 1.2% by weight of active sodium oxide ($Na_2O$), at a pressure in the range of about 15 to 45 p. s. i. and at a boiling temperature, and maintaining the solution at said pH throughout the course of said digesting step.

6. The method of producing fibers processable by a conventional textile fiber processing system from undecorticated ramie which comprises digesting the undecorticated ramie, while green, with an aqueous solution of an alkali metal salt having a pH of 12.4 to 13 and containing about 0.37 to about 1.2% by weight of active alkali metal oxide at a pressure in the range of about 15 to 45 p. s. i. and at a boiling temperature, maintaining the solution at said pH throughout the course of said digesting step, removing the resulting material from the solution, washing and drying such material, and thereby recovering dry, processable fibers.

7. The method of disassociating stem and leaf fibers from the gums, bark and ligneous matter of undecorticated fiber-containing vegetable material selected from the class consisting of ramie, linen flax, jute, hemp, sisal, pita, and seed flax, which comprises digesting the material with an aqueous solution of an alkali metal salt having a pH of 12.4 to 13 and containing about 0.37 to about 1.2% by weight of active alkali metal oxide at a pressure in the range of about 15 to 45 p. s. i. and at a boiling temperature, maintaining the solution at said pH throughout the course of said digesting step, removing the resulting material from the solution, washing and drying such material, and thereby recovering dry, processable fibers.

JOHN C. van DYK.

References Cited in the file of this patent

UNITED STATES PATENTS

| Number | Name | Date |
|---|---|---|
| 8,134 | Claussen | June 3, 1851 |
| 52,545 | Dixon | Feb. 13, 1866 |
| 105,884 | Baker | Aug. 2, 1870 |
| 686,620 | Lester | Nov. 12, 1901 |
| 1,025,435 | Weiberg | May 7, 1912 |
| 1,790,838 | Richter | Feb. 3, 1931 |
| 1,866,917 | Worden | July 12, 1932 |
| 2,026,584 | Manahan | Jan. 7, 1936 |
| 2,068,151 | Remler | Jan. 19, 1937 |
| 2,128,928 | Estes | Sept. 6, 1938 |
| 2,353,947 | Svoboda | July 18, 1944 |
| 2,466,290 | Wells | Apr. 5, 1949 |

FOREIGN PATENTS

| Number | Country | Date |
|---|---|---|
| 452,082 | Great Britain | Aug. 17, 1936 |

OTHER REFERENCES

Article by Snell in "Paper Industry and Paper World," pp. 1246, column 3.

Article in "Technical Assoc. Papers," Series 25, 1942 (pp. 578–585) (pp. 581 pertinent).

Handbook of Chemistry and Physics, 28th ed., pages 1553–1555, (1944), published by Chemical Rubber Publishing Co. Cleveland, Ohio.